Figure 1:
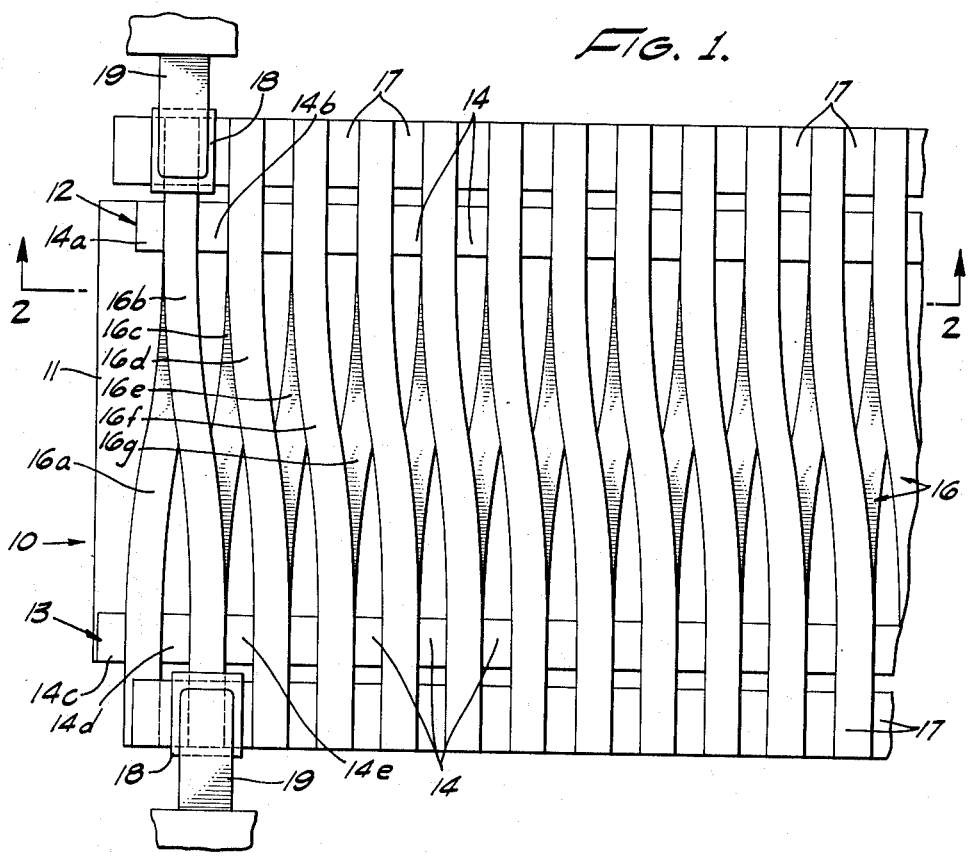

Dec. 7, 1965   A. J. WADSWORTH   3,222,493
APPARATUS AND METHOD FOR POSITIONING AND HOLDING BARS DURING
WELDING THEREOF INTO ZIGZAG SERIES-CONNECTED RELATIONSHIP
Filed Oct. 20, 1955

ARTHUR J. WADSWORTH
INVENTOR.

3,222,493
APPARATUS AND METHOD FOR POSITIONING AND HOLDING BARS DURING WELDING THEREOF INTO ZIGZAG SERIES-CONNECTED RELATIONSHIP
Arthur J. Wadsworth, Tujunga, Calif., assignor, by mesne assignments, to the United States of America as represented by the Secretary of the Navy
Filed Oct. 20, 1955, Ser. No. 541,862
4 Claims. (Cl. 219—58)

The present invention relates to an apparatus and method for positioning bars or rods for end welding into a closely spaced generally zigzag nest or bank. More particularly, the invention relates to a fixture and method for assemblying and holding bars in zigzag relationship during the manufacture of non-fragmentation warheads for antiaircraft missiles.

In manufacturing non-fragmentation warheads for missiles such as are used for antiaircraft purposes, it is necessary that a plurality of steel bars be welded or otherwise secured in zigzag series-connected relationship and in a double layer, the bars of the completed warheads being in lateral surface contact with each other. In such warhead structures it is extremely desirable that the corresponding ends of the bars or rods, to be connected by the welding process be straight and exactly parallel to each other so that all offsetting is done in the central portions of the bars.

It has been discovered that the various pairs of bars or rods to be welded should not be disposed adjacent each other during the welding step since this results in fanning out of the bar pair being welded and in sticking thereof to adjacent bar pairs. Furthermore, the heat from the welding operation adversely affects the adjacent bars pairs, for example by causing formation of a delerious oxide coating thereon, which greatly reduces the strength of a weld subsequently formed on such adjacent bar pairs.

In view of the above factors, it is an object of the present invention to provide a method and apparatus for positioning and holding bars during welding or connecting thereof into zigzag series-connected relationship, which method and apparatus result in the formation of welded bar pairs having straight parallel ends and offset in their central portions by an amount just sufficient to result in a tightly packed two-layer zigzag nest or bank.

A further object of the invention is to provide a method and a fixture for holding corresponding ends of bars or rods in parallel relationship and spaced from adjacent ends, so that the welding of one pair of ends does not adversely affect the subsequent welding of adjacent pairs of ends, the arrangement being such that upon removal of the welded bars from the fixture they spring into surface engagement with adjacent bars to form a closely packed double-layer bank as desired.

These and other objects and advantages of the invention will be more fully set forth in the following specification and claims considered in connection with the attached drawing to which they relate.

Figure 2:
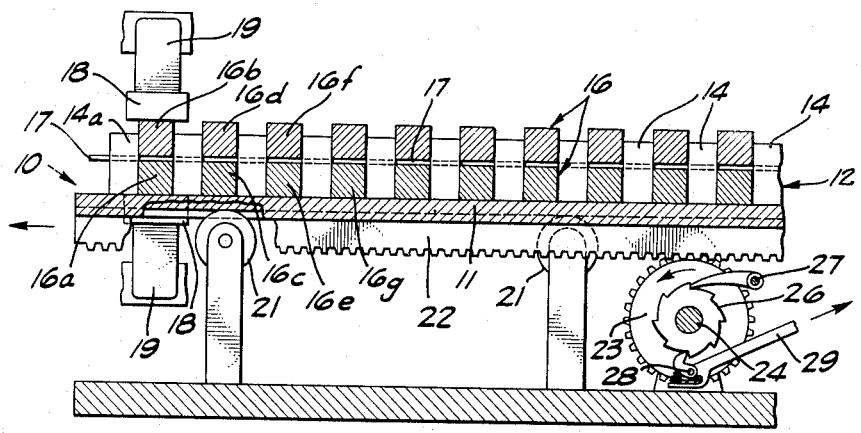

In the drawing:

FIGURE 1 is a schematic top plan view of the fixture of the invention, showing the bars as mounted therein in position for welding; and FIGURE 2 is a vertical sectional view taken along line 2—2 of FIGURE 1 and illustrating the welding electrodes as well as the means for indexing the fixture in the time intervals between welding steps.

Referring to the drawing, the fixture of the invention is indicated generally at 10 as comprising an elongated generally rectangular horizontally disposed plate 11 having rows 12 and 13 of teeth 14 fixedly provided along the opposite upper edge portions thereof. The row 12 at the upper portion of the showing of FIGURE 1 is offset longitudinally of plate 11, relative to row 13, by a distance sufficient to effect the desired offsetting of the ends of steel bars or rods 16 to be series-connected in zig-zag relationship.

The gaps between the teeth 14 of the offset parallel rows 12 and 13 are just wide enough to receive the bars 16, the ends of the bars then being held straight and parallel to each other (and perpendicular to rows 12 and 13) as desired, and the center bar portions being twisted or offset. The bars thus assume elongated S-shapes. The bars 16 are mounted in the fixture 10 in upper and lower layers or banks, the teeth 14 being sufficiently high to hold the bars in both banks as shown in FIGURE 2. In mounting the bars in the fixture, the bars 16a, 16c, 16e, 16g, etc., in the lower layer are first mounted adjacent plate 11 between the respective teeth 14 of the offset rows 12 and 13. This may be performed manually, with one end of bar 16a, for example, being first inserted between teeth 14a and 14b, the bar 16a then being twisted so that its other end may be mounted between teeth 14c and 14d.

After all of the bars 16 in the lower layer are mounted adjacent plate 11, the upper layer of bars 16 is mounted in the same manner, but with offsetting in the opposite direction. Thus, an upper bar 16b, for example, is mounted with one end between teeth 14a and 14b above the end of bar 16a, the remaining end of bar 16b being mounted between teeth 14d and 14e above an end of bar 16c. Correspondingly, upper bar 16d is mounted with one end above the corresponding end of lower bar 16c, the other end of bar 16d being mounted above an end of bar 16e. Also, bar 16f is mounted with one of its ends above the remaining end of bar 16e and with the other of its ends above an end of bar 16g.

From the above it will be seen that the bars 16 in the upper and lower layers or banks are mounted in zigzag, series relationship, with the corresponding bar pair ends 16a–16b, 16b–16c, 16c–16d, 16d–16e, etc., being straight and parallel to each other and spaced from the adjacent bar pair ends.

The bars or rods 16 are substantially longer than the width of fixture 10, so that the pairs of bar ends project laterally from the grooves or gaps between teeth 14. A shim strip 17 is mounted longitudinally of each edge of fixture 10 between the projecting ends of the upper and lower bars 16. The strip 17 is employed in the resistance welding of the respective upper and lower bar ends to each other by means of electrodes 18 and associated horns 19 of a suitable resistance welding apparatus, not shown. As is set forth in detail in copending application Serial No. 541,863, filed October 20, 1955 for a Method of Welding Non-Fragmentation Warheads for Missiles, Particularly Antiaircraft Missiles, and assigned to the assignee of the present invention, the electrodes 18 are clamped above and below each pair of projecting bar ends so as to compress the shim strip 17 between the bar ends. Thereafter, a welding current is passed between the electrodes 18 and through the bars 16 and shim strip 17 to form resistance welds at the interfaces between the shim strip and the bars.

As shown in FIGURE 1, one welding apparatus is associated with each side of fixture 10, so that welds may be simultaneously made at opposite ends of each bar such as the one 16b shown in FIGURE 1. After the making of such welds, the fixture 10 is indexed one step to cause the next adjacent pair of bar ends to be disposed between the electrodes 18 of the resistance welding machines. The process is then repeated until the various bar ends have been welded to each other in series-connected relationship. More specifically, bar 16a is welded to bar 16b at the upper portion of FIGURE 1, bar 16b is welded to bar 16c at the lower portion of FIGURE 1, bar 16c is welded to bar 16d at the upper portion of FIGURE 1, bar 16d is welded to bar 16e at the lower portion of FIGURE 1, bar 16e is welded to bar 16f at the upper portion of FIGURE 1, bar 16f is welded to bar 16g at the lower portion of FIGURE 1, and so forth until all of the bars in the upper and lower banks have been series-welded to each other.

To provide automatic indexing of fixture 10 in order to cause various bar end pairs to be disposed between the welding electrodes 18, a suitable indexing apparatus may be provided such as is shown in FIGURE 2. The illustrated apparatus comprises a pair of supporting rolls 21 on which the plate portion 11 of fixture 10 is movably mounted, and a rack bar 22 welded longitudinally on the underside of the plate 11. Rack 22 meshes with a pinnion 23 which is fixedly mounted on a shaft 24 having a ratchet wheel 26 thereon. Wheel 26 is, in turn, associated with both a holding pawl 27 and an actuating pawl 28, the latter being connected through a shaft 29 to a suitable reciprocating actuating apparatus. Upon reciprocation of shaft 29, the ratchet wheel 26 and thus shaft 24 are rotated counterclockwise as viewed in FIGURE 2, which operates through pinion 23 and rack bar 22 to shift the fixture 10 one step to the left in FIGURE 2 as desired.

After all of the welds have been completed, the connected banks of bars or rods 16 are lifted out of the fixture 10. The portions of shim strips 17 between the various pairs of connected bar ends are then sheared out and the bar ends are ground on their sides so as to make them flush with the center portions of the bars. The connected bars 16 are then annealed, after which they are assembled into the warhead as set forth in copending application Serial No. 568,420, filed February 21, 1956 for Apparatus and Method for Assembling a Missile Warhead.

It is important to the invention that the initial offsetting of the ends of each bar 16, during mounting thereof into the fixture 10, does not exceed the elastic limit of the bar. Accordingly, upon removal of the welded banks of bars from fixture 10 and upon shearing of the shim strips 17 from between the bar ends, the bars naturally spring together into closely packed or nested relationship, the sides of the various bars 16 then being in surface contact with each other. A closely packed two-layer nest or bank of series-connected bars 16 is thus formed.

The construction of the fixture 10 and the mounting of the bars 16 in the fixture as indicated, effects a lateral spacing of the various pairs of bar ends during the welding process but permits such bar end pairs to spring into surface contact with adjacent bar end pairs subsequent to welding. This action is extremely desirable since it effects separation of the bar end pairs during welding, so that the heat, flash and spatter caused during a single welding operation will not adversely affect the adjacent pairs of bar ends so as to make welding of the latter more difficult or impossible. It has been found that if the described separation of the various bar end pairs is not effected, they tend to wedge out and stick to adjacent bar end pairs so that they must be cut apart. Such cutting of the various pairs of bar ends is extremely costly and otherwise unsatisfactory.

It has previously been stated that the outer bar end pairs 16a–16b, 16b–16c, 16c–16d, etc., must be straight and parallel to each other, and perpendicular to the longitudinal axis of the bank of bars, although the central portions of the bars are necessarily twisted to permit the described offset or zigzag relationship. Where the bars 16 are generally rectangular in section as indicated in FIGURE 2, the teeth 14 of fixture 10 are also made rectangular and their sides are spaced so that there is just sufficient room between them to receive the bar ends. The dimensions of teeth 14 transversely of the fixture 10 are sufficiently long to hold the outer portions of the bars 16 parallel to each other as shown in FIGURE 1, all twisting or bending then occurring in the central bar portions as desired.

In a preferred form of the invention, the bars or rods 16 are each approximately twenty and three-quarter inches long and one-quarter inch square in section. The transverse dimension of each tooth 14 is then made sufficiently great to hold approximately four inches of each bar end in the parallel relation illustrated in FIGURE 1. Preferably, each tooth 14 has a dimension longitudinally of fixture 10 which is generally equal to the width of the bar, or about one-quarter inch in the illustration. With such an arrangement, one end of each bar 16 is offset one-quarter inch with relation to the other end thereof. This spacing may, however, be varied so long as the elastic limit of the bars is not exceeded and so long as the bar ends are not disposed sufficiently close together to permit the welding of one pair of bar ends to adversely affect the adjacent pairs of bar ends.

To summarize the method of the invention, one end of a bar 16 is held rigid while the central portion of the bar is twisted or flexed to cause the bar to assume a gentle elongated S-curve, the other end of the bar then also being held rigid and parallel to the first end but offset therefrom. A number of other bars are then held and twisted or flexed in the same manner, and lie parallel to the first bar and in the same plane. The amount of flexing is, however, not sufficient to exceed the elastic limit of the bars.

After a first layer of bars is thus formed, a second layer is mounted above the same by corresponding holding and twisting operations, but with offsetting in the opposite direction. Corresponding pairs of bar ends are thus provided in adjacent relationship, and are welded either by the method described in the cited copending application Serial No. 541,863, or by another method. The amount of offsetting is sufficient to space the bar end pairs by a distance preventing the making of one weld from causing oxidation or other harm to the prepared surfaces of the bar ends adjacent thereto.

After the two layers of bars have thus been welded in a double-layer zigzag series-connected relationship, they are released from the means holding the same and, because the elastic limit was not exceeded during mounting of the bars in position for welding, they spring together to form tightly spaced or packed nests or banks as desired.

While the particular method and apparatus herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. The method of assembling a plurality of elongated metal rods rigidly together in two superimposed layers such that all rods are connected in series with the central body portions of each connected pair lying closely together with their respective axes in parallel planes but at slight angles to one another within said planes, said method comprising arranging a series of rods in two superimposed layers, oppositely flexing within their elastic limit the rods in each layer in the plane of their respective layers to bring the opposite ends of a rod in one layer into overlapping aligned relationship with the adjacent ends of different rods in the other layer, holding the overlapped, aligned ends of the rods of said superimposed layers to thereby maintain said rods in said oppositely flexed positions, electrically welding said overlapped, aligned rod ends together, and thereafter withdrawing said holding forces.

2. The method defined in claim 1 wherein said welding step is performed while the pairs of overlapping rods to either side of a pair being welded are spaced laterally therefrom.

3. The method defined in claim 1 wherein the overlapped ends of said layers of rods are advanced one pair at a time in succession past a welding station.

4. Welding apparatus for use in rigidly joining the overlapped ends of superimposed layers of elongated, rectangular rods, said apparatus comprising a flat, rigid member having a width substantially narrower than the length of the rods being welded together, a row of upwardly projecting, spaced teeth extending along each of the two lateral edges of said member transverse to the width thereof, said rows being parallel and the teeth in one row being opposite the gaps between teeth of the other row, said teeth of each row having a height greater than the combined thickness of the rods to be held and being spaced apart a distance just slightly greater than the width of said rods, the opposed surfaces of the teeth in each row being parallel and extending normal to the direction in which said row extends, whereby said rows of teeth are adapted to hold the aligned, overlapped, mating ends of rods of a plurality of layers rigidly in position for welding with the central portions of the rods of adjacent layers under oppositely acting stresses and with said ends protruding beyond the lateral edges of said jig member, high pressure welding electrode means along each lateral edge of said flat member and spaced therefrom for clamping said protruding overlapped rod ends together under high pressure acting across their abutting surfaces and for passing a welding current therethrough until fusion occurs, and indexing means for moving said flat member relative to both of said welding electrode means transversely of said rod ends to bring said overlapped ends successively into welding position.

References Cited by the Examiner

UNITED STATES PATENTS

| | | | |
|---|---|---|---|
| 345,767 | 7/1886 | Buckley | 29—173 |
| 527,856 | 10/1894 | Hookham | 29—173 |
| 1,930,891 | 10/1933 | Wickwire | 189—82 |
| 1,961,991 | 6/1934 | Southwell | 219—56 |
| 2,187,504 | 1/1940 | Stuck | 29—480 |
| 2,324,229 | 7/1943 | Neale | 189—82 |
| 2,326,022 | 8/1943 | Everett | 113—99 |
| 2,366,168 | 1/1945 | Bakarian | 29—475 |
| 2,385,357 | 9/1945 | Haas | 29—173 |
| 2,487,462 | 11/1949 | Meyer | 219—117 |
| 2,529,265 | 11/1950 | Rose et al. | 29—173 |
| 2,739,558 | 3/1956 | Bieg | 113—99 |

FOREIGN PATENTS 821,527  8/1937  France.

RICHARD M. WOOD, *Primary Examiner.*

ARTHUR M. HORTON, *Examiner.*